3,801,524
ENTROPICALLY STABILIZED WATER BASE DISPERSIONS

Fred Walter Parker, Rochester, Mich., assignor to E. I. du Pont de Nemours and Company, Wilmington, Del.
No Drawing. Continuation-in-part of application Ser. No. 139,203, Apr. 30, 1971, now Patent No. 3,729,439. This application Dec. 18, 1972, Ser. No. 316,405
Int. Cl. C08f 37/00, 15/40
U.S. Cl. 260—29.6 WB       10 Claims

ABSTRACT OF THE DISCLOSURE

Graft copolymers having graft segments which contain hydroxy terminated acrylic monomers which enable the copolymer to form water base dispersions which are useful as finishes for automobile and truck bodies.

CROSS-REFERENCE TO RELATED APPLICATIONS

This application is a continuation-in-part of my application Ser. No. 139,203, filed Apr. 30, 1971, now Pat. No. 3,729,439.

BACKGROUND OF THE INVENTION

In an era of ecological concern, a water base finishing composition would have obvious merit. Typical finishes are organosol dispersions wherein a copolymer is dispersed in an organic medium. This medium commonly may contribute volatile solvents to the atmosphere. Attempts to produce water base dispersions have proven unsuccessful for a number of reasons such as polymer kickout, poor spray application, poor reflow thermosetting characteristics, low solids content and the like.

SUMMARY OF THE INVENTION

This invention relates to graft copolymers which form dispersions in a water base medium which are subsequently referred to as aquasols. The graft segment of the graft copolymer must contain water soluble hydroxylated acrylic monomers. The graft copolymers of this invention are entropically stabilized and have the unique capability of reversibly changing from a solution phase to a dispersion upon the addition of water. Water miscible organic solvents can be used to reconvert the dispersion back to a solution.

DESCRIPTION OF THE INVENTION

The synthetic organic copolymer used in the compositions of this invention is a graft copolymer. These graft copolymers can be represented by the recurring unit structure A–B, where A is the backbone segment of the molecule and B is a graft segment, attached to A by a chemical bond.

The A portion of the molecule can be further represented by an a–b structure, i.e. the backbone is a copolymer composed of monomer units (a) and monomer units (b), where the (a) portion, i.e. the (a) monomer units, of the A segment is composed of monomer units from monomers of the general structure Formula 1

$$CH_2=\overset{R}{\underset{}{C}}COOR_1$$

where R is H, $CH_3$ or $-CH_2CH_3$, and $R_1$ is an alkyl or cycloalkyl group of 1 through 18 carbon atoms.

These monomers are esters of acrylic acid, methacrylic acid and ethacrylic acid. Lower alkyl methacrylates, wherein the alkyl group has 1 through 4 carbons, such as methyl methacrylate, are especially preferred.

The (a) portion should constitute at least 85% by weight of the total A segment.

Although ordinarily the (a) portion will be composed entirely of these acrylic units referred to above, up to about 50% of its weight can consist of other monomers which do not contribute active grafting sites to the backbone. Illustrative of these are acrylic acid, methacrylic acid and their amides and nitriles; vinyl acetate; styrene; alpha methyl styrene; vinyl toluene, 3-(2-methacryloxyethyl)-2,2-spirocyclohexyl-oxazolidine, and the like.

The (b) portion, i.e. the monomer units (b), of the A backbone segment provides the potential active grafting sites, i.e. points for attachment for the B branch segment or segments.

The (b) portion of the A segment, which comprises up to 15%, preferably 0.2–5%, even more preferably 0.4–3%, by weight of the total A segment, can be any monomer units that provide available active grafting sites for graft polymerization. Representative of useful grafting site monomer units are those having the following general formula:

Formula 2

$$CH_2=\overset{Y}{\underset{\underset{Z}{X}}{C}}$$

where
X is $$-\overset{O}{\underset{}{\overset{\|}{C}}}-O-$$

(the carbon atom in this group being attached directly to the backbone), $$-O-, \text{ or } -\overset{O}{\underset{}{\overset{\|}{C}}}-$$

Y is hydrogen, $-CH_3$ or $-CH_2CH_3$;
Z is $$-CH_2-\overset{R_2}{\underset{}{C}}=CH-R_3$$

where $R_2$ and $R_3$ are Y $$-CH_2\!\!-\!\!\!\left\langle\!\!\bigcirc\!\!\right\rangle\!\!-\!\!R_4, \quad -CH_2-N\!\!<\!\!\!\begin{array}{c}R_4\\R_5\end{array}, \quad -CH_2-CH_2-N\!\!<\!\!\!\begin{array}{c}R_4\\R_5\end{array}$$

where $R_4$ and $R_5$ are H or alkyl of 1 through 4 carbon atoms, or $$-CH_2-CH_2-O-R_6$$

where $R_6$ is an alkyl group of 1 through 4 carbon atoms;

$$-CH_2CH_2-O-\overset{O}{\underset{}{\overset{\|}{C}}}-\underset{Y}{C}=CH_2;$$

$$-CH_2-\overset{H}{\underset{OH}{C}}-CH_2O\overset{O}{\underset{}{\overset{\|}{C}}}-\overset{Y}{\underset{}{C}}=CH_2$$

where Y has the same meaning as above;

$$-CH_2\overset{H}{\underset{OH}{C}}-CH_2NHCH_2CH=CH_2;$$

$$-CH_2-\overset{H}{\underset{OH}{C}}-CH_2O\overset{O}{\underset{}{\overset{\|}{C}}}-CH_2-SH;$$

or $$-CH_2-CH_2-O-\overset{O}{\overset{\|}{C}}-CH=CH-COOH$$

provided that when

X is $$-\overset{O}{\overset{\|}{C}}-$$

Z is —H or —NH—CH$_2$—CH=CH$_2$ and provided further that the combined —X—Z group is (p-isopropylphenyl group structure: benzene ring with CH$_3$—C(H)—CH$_3$ substituent)

Allyl methacrylate is one preferred monomer for the grafting site.

Other preferred grafting site monomers are as follows:

$$CH_2=\overset{Y}{\overset{|}{C}}-\overset{O}{\overset{\|}{C}}-O-CH_2-N\overset{R_4}{\underset{R_5}{\diagdown}}$$

such as dimethylamino methylmethacrylate, diethylamino methylacrylate, dipropylamino methylmethacrylate, butylpropylamino methacrylate, dibutylamino methylmethacrylate, and the like;

$$CH_2=\overset{Y}{\overset{|}{C}}-\overset{O}{\overset{\|}{C}}-O-CH_2-CH_2-N\overset{R_4}{\underset{R_5}{\diagdown}}$$

such as diethylamino ethylmethacrylate, diethylamino ethylacrylate, dimethylamino ethylmethacrylate, methylpropylamino ethylmethacrylate, dibutylamino ethylacrylate, butylpropylamino ethylmethacrylate, and the like $$CH_2=\overset{Y}{\overset{|}{C}}-\overset{O}{\overset{\|}{C}}-O-CH_2-CH_2-O-R_6$$

such as butoxyethylmethacrylate, butoxyethylacrylate, methoxyethylmethacrylate, methoyyethylacrylate, ethoxyethylmethacrylate, ethoxyethylacrylate, propoxyethylmethacrylate, propoxyethylacrylate, and the like;

$$CH_2=\overset{Y}{\overset{|}{C}}-\overset{O}{\overset{\|}{C}}-O-CH_2-\underset{\underset{OH}{|}}{C}-CH_2-NHCH_2-CH=CH_2$$

such as 2-hydroxy-3-allylaminopropyl methacrylate and 2-hydroxy-3-allylaminopropyl acrylate;

$$CH_2=\overset{Y}{\overset{|}{C}}-\overset{O}{\overset{\|}{C}}-O-CH_2-\underset{\underset{OH}{|}}{\overset{H}{\overset{|}{C}}}-CH_2-O-\overset{O}{\overset{\|}{C}}-\overset{Y}{\overset{|}{C}}=CH_2$$

such as 2-hydroxy-3-acryloxypropyl methacrylate and 2-hydroxy-3-acryloxypropyl acrylate.

In the above formulas Y, R$_4$, R$_5$ and R$_6$ have the same meaning as previously indicated.

The A segment or backbone comprises from 60–90% by weight of the total A-B graft copolymer, preferably 70–80%. It will have a number average molecular weight of 10,000 to 200,000. Particularly advantages are obtained especially when the water dispersion is used as a coating composition, when the backbone segment is at least about 60% by weight of the total graft copolymer. Best results in automotive finish applications are obtained when the backbone segment is at least about 70% by weight of the total graft copolymer in order to minimize water sensitivity.

The B segment is the branch segment or branch segments of the graft copolymer. The B segment of the graft copolymer molecule can be partially composed of monomer units from monomers of the general structure of Formula 1 above.

The B segment must contain water miscible or water soluble hydroxylated acrylic monomers. Illustrative of such water soluble monomers are hydroxyethyl acrylate, hydroxyethyl methacrylate, hydroxypropyl methacrylate, hydroxypropyl acrylate, hydroxybutyl acrylate, and hydroxybutyl methacrylate.

These hydroxy terminated monomers can comprise from 70–100% of the B segment. There should be a sufficient amount of hydroxy terminated monomers in the graft segment in order that from about 7 to 40% by weight of the total graft copolymer is hydroxy acrylic monomers, preferably about 15%.

The graft segment ordinarily constitutes from 10–40% by weight of the total graft copolymer, preferably 10–35%. The number average molecular weight of the graft segment will range from 2,000–20,000.

The A segment or backbone of the graft copolymer should have a solubility parameter value of 7 to 12. Proper maintenance of a solubility parameter gradient between the backbone and graft segment results in unique stability of the polymer.

The solubility parameter is a physical constant which can be used to characterize any given polymer [1] or organic solvent [2] which may be used in a dispersion of such polymer. The solubility parameter of various solvents and resins can be calculated from various formulae. One of the simplest of these formulae is Solubility parameter $$\text{of a substance} = \sqrt{\frac{(\text{Heat of vaporization}) \times (\text{density})}{\text{Molecular weight}}}$$

Since the heat of vaporization is a factor directly influencing the solubility of parameter value, the solubility parameter is a value which is absolute and takes into account all the physical forces acitng on any specific polymer.

Knowledge of the solubility parameter for a given copolymer and solvent or solvent blend enables one to accurately predetermine whether or not a suitably stable dispersion can be created from these parameter characterized components.

Proper solubility parameter balance between the backbone and graft segment of the copolymer used in the system is important. To achieve maximum stability, the solubility parameter of the backbone (determined as an entity) should differ from that of the continuous phase and the graft segment (determined as an entity). The solubility parameter of the graft segment and continuous phase should be similar to achieve maximum stability.

It should be noted that solubility parameter of the backbone or graft polymer entity is a single value. This value is obtained as a result of a single algebraic relationship based on the solubility parameter of the monomers which form the polymeric entity and the ratio of the monomers to the total monomeric composition of the entity.

A solubility parameter gradient between the backbone segment of the graft copolymer and the graft segment or continuous phase should be about 8 parameter units, for an acceptable dispersion stability preferably 5 to 7 units. A solubility parameter difference of less than 2.0 units will lead to dispersions of markedly reduced stability.

The solubility parameter of the backbone segment of the copolymer should be from about 7.0 to 12.0 parameter units with a range of about 8.0 to 10.5 parameter units being preferred.

---

[1] "Solubility Parameters for Film Formers," H. Burrell, Official Digest, Federation Paint and Varnish Production Clubs, Oct. 27, 1955, pp. 726–758.

[2] "A Solvent Formulating Chart," H. Burrell, Official Digest, Federation Paint and Varnish Production Clubs, Nov. 29, 1957, pp. 1159–1173; and "New Values of the Solubility Parameters from Vapor Pressure Data," K. L. Hoy—Journal of Paint Technology, 42, No. 542, 76 (1970).

The solubility parameter of the graft segment can be about 12 to 22 parameter units preferably 14 to 18 parameter units.

The continuous phase (everything in a liquid state) is generally comprised of a solvent or solvent blend and any plasticizers that are included in the dispersion. The solubility of the continuous phase can be about 12–22 parameter units, preferably 14–18 parameter units. This coincides with the aforementioned range of the graft segment.

Virtually any water miscible organic solvent could function as part of the continuous phase irrespective of its individual solubility parameter, so long as the solubility parameter of the total continuous phase falls within the prescribed limits. Each component of the continuous phase contributes to the solubility parameter of the continuous phase per se. The degree of contribution is in direct proportion to the solubility parameter of the individual solvent and the amount of said solvent that is used.

Water miscibility of the blend of solvents used for the continuous phase is necessary. A continuous phase where the solvents are not water miscible could lead to a form of instability. It should be pointed out however, that in a multi component solvent there could be an immiscible pair of solvents; however, they could become miscible in the presence of a third solvent, a so-called "bridging solvent." In such an instance, the solubility parameter of the total continuous phase would still fall within the prescribed limit.

Solvents that are not at least 25% soluble by volume in water are undesirable in this invention. Solvents exhibiting partial solubility in water (below 25%) can be tolerated so long as they do not adversely effect the aforementioned solubility parameter limitations. Illustrative of solvents that are infinitely soluble in water are:

| | Solubility parameter |
|---|---|
| Acetone | 9.6 |
| Butyl Carbitol (diethylene glycol monobutyl ether) | 9.8 |
| Butyl Cellosolve (ethylene glycol monobutyl ether) | 9.9 |
| Carbitol acetate (diethylene glycol monobutyl ether acetate) | 9.5 |
| Carbitol solvent (diethylene glycol monoethyl ether) | 10.3 |
| Cellosolve solvent (ethylene glycol monoethyl ether) | 10.7 |
| Diacetone alcohol | 10.2 |
| Diethyl Carbitol (diethylene glycol diethyl ether) | 8.7 |
| Methanol | 14.5 |
| Methyl Carbitol (diethylene glycol monomethyl ether) | 11.2 |
| Methyl Cellosolve (ethylene glycol monomethyl ether) | 11.7 |
| Methyl Cellosolve acetate (ethylene glycol monomethyl ether acetate) | 9.9 |
| Isopropanol | 11.5 |
| Ethanol | 12.8 |

Preferred compositions of this invention are graft copolymers having a backbone of methylmethacrylate/butyl methacrylate/allyl methacrylate in a 69/15/1 ratio by weight to the total copolymer; and a backbone of hydroxy propyl methacrylate or hydroxy propyl methacrylate/acrylic acid in ratios to the total copolymer of 15 or 12/3, respectively.

PREPARATION

The graft copolymers of this invention are prepared by conventional solution polymerization techniques that are well known and widely used in the art. However, to achieve compatibility with water, the polymerization should be carried out in a solvent or solvent blend that is infinitely water soluble.

In order to invert the graft copolymer from the solution phase in which it is formed to a dispersion, a 50/50 mixture of water and isopropanol is used. Sufficient amounts of this mixture should be added until the proper solubility parameter value and desired percent solids content are achieved.

UTILITY

The graft copolymers of this invention have particular utility as coating compositions. Pigments, metallics, plasticizers, and dispersants can be admixed to produce excellent lacquer finishes for automobiles, appliances, furniture, and the like.

The use of water in the dispersion substantially cuts down the amount of volatile solvents emitted into the atmosphere by present paint application procedures. This advantage has obvious merit in view of the ecology situation. The use of water is also desirable due to its low cost and minimal toxicity. These dispersions have unique stability and wide formulation latitude. Unusually large amounts of solvent can be added without irreversibly precipitating the polymer thereby ruining the composition. The absence of surfactants makes these coating compositions foam free which enables one to apply higher quality films free from pin holding.

Useful enamel finishes can be prepared from these dispersions by adding some water miscible amino resin cross linker. Melamine formaldehyde is an effective cross linker in amounts of 10 to 40% based on the weight of the copolymer, preferably about 10 to 30%.

Coating compositions prepared from the dispersions of this invention can be applied using conventional application techniques such as spraying, brushing, dipping and the like. A thermal cure at about 300° F. can be used to set films of these compositions and effectuate curing in the case of enamels.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept of the invention. All parts unless otherwise indicated are by weight.

EXAMPLE 1

A water base dispersion of a graft copolymer having a backbone of a 70/14/1 ratio by weight of graft copolymer of methyl methacrylate/butyl methacrylate/allyl methacrylate and a graft segment having a 10/5 ratio by weight of graft copolymer of hydroxyethyl acrylate/acrylic acid was prepared by:

(1) Adding to a reflux flask:

700 parts methyl methacrylate
140 parts butyl methacrylate
10 parts allyl methacrylate
350 parts anhydrous isopropyl alcohol
75 parts ethylene glycol monobutyl ether
117 parts butyl alcohol
and heating this mixture to reflux.

(2) A mixture of: 3 parts Vazo initiator (azo-bis-isobutylronitrile): 12 parts anhydrous isopropyl alcohol, and 3 parts butyl alcohol was added to the mixture of (1) and the resultant mixture heated to reflux.

(3) A mixture of: 1.5 parts Vazo initiator (azo-bis-isobutyronitrile); 7 parts anhydrous isopropyl alcohol, and 3 parts butyl alcohol was added to the mixture of (2) and the resultant mixture allowed to cool to 87° C.

(4) A mixture of:

103 parts 2-hydroxyethylacrylate
50 parts acrylic acid
49 parts anhydrous isopropyl alcohol
16 parts butyl alcohol
1.5 parts Lupersol 11 (75% solution of tertiary butyl peroxypivalate in mineral spirits)

was added to the mixture of (3) and the mixture heated at about 87° C. for about 1 hour.

(5) 15 parts of anhydrous isopropyl alcohol and 0.8 part of Lupersol 11 were then added to the mixture of (4) with cooling to about 77° C. followed by another addition of 15 parts anhydrous isopropyl alcohol and 0.4 part Lupersol.

(6) 134 parts anhydrous isopropyl alcohol were added to the mixture of (5) followed by 500 parts of demineralized water to produce the water based dispersion.

EXAMPLE 2

A water base dispersion of a graft copolymer having a backbone of a 70/14/1 ratio (by weight of the graft copolymer of methyl methacrylate/butyl methacrylate/ allyl methacrylate and a graft segment of a 15 ratio by weight of 2-hydroxy ethyl acrylate was prepared in accordance with the procedure of Example 1 except that the addition made in Step 4 was modified so that 155 parts of 2-hydroxy ethyl acrylate, 130 parts anhydrous isopropyl alcohol, and 1.5 parts of Lupersol 11 were substituted for the original add as made in Example 1, Step (4).

EXAMPLE 3

A water base dispersion of a graft copolymer having a backbone of a 59/25/1 ratio (by weight of graft copolymer) of methyl methacrylate/butyl methacrylate/ allyl methacrylate and a graft segment of a 15 ratio by weight of hydroxy propyl methacrylate was prepared by:

(1) Adding to a reflux flask 2,006 parts methyl methacrylate
850 parts butyl methacrylate
34 parts allyl methacrylate
119 parts acetone
2,312 parts n-propyl alcohol
340 parts ethylene glycol monobutyl ether.

This mixture was then heated to reflux.

(2) To the mixture of (1) was added: 14.6 parts Vazo initiator (azo-bis-isobutyronitrile), and 51.0 parts n-propyl alcohol while reflux was maintained.

(3) To the resultant mixture of Step (2) was added:

7.5 parts Vazo initiator (azo-bis-isobutyronitrile)
34.0 parts n-propyl alcohol followed by another addition of:

3.7 parts Vazo initiator (azo-bis-isobutyronitrile)
34.0 parts n-propyl alcohol and the resultant mixture allowed to cool.

(4) To the resultant mixture of Step (3) a mixture of 530 parts of a 96% composition of hydroxy propyl methacrylate, with 3% acrylic acid and 1% of the dimers of hydroxy propyl methacrylate and methacrylic acid; 100 parts acetone; 342 parts n-propyl alcohol and 5.1 parts benzoyl peroxide. This mixture was maintained at reflux temperature followed by an addition of 34 parts acetone and 2.7 parts of benzoyl peroxide.

(5) To the resultant mixture of Step (4) was added an additional 34 parts of acetone, 2.4 parts of benzoyl peroxide while reflux was maintained. Heating was then discontinued and 1700 parts n-propyl alcohol was added to the mixture. This resin will yield a water based dispersion upon admixture with the ionized water, thereby demonstrating the inversibility of such a system.

EXAMPLE 4

A water base dispersion of a graft copolymer having a backbone of a 69/21/1 ratio (by weight of the total copolymer of methyl methacrylate/butyl methacrylate/ allyl methacrylate and a graft segment of a 6/3 ratio by weight of hydroxy propyl methacrylate acrylic acid was prepared by:

(1) Adding to a reflux flask:

690 parts methyl methacrylate
210 parts butyl methacrylate
7 parts allyl methacrylate
30 parts acetone
645 parts n-propyl alcohol
200 parts ethylene glycol monobutyl ether.

This mixture was heated to reflux.

(2) Upon termination of the heating the mixture of Step (1), 0.3 part Vazo initiator (azo-bis-isobutyronitrile) and 15 parts n-propyl alcohol was added to the resultant mixture of Step (1). This was followed by an additional add of 2.2 parts of Vazo initiator (azo-bis-isobutyronitrile), and 10 parts of n-propyl alcohol.

(3) The resultant mixture of Step (2) was then heated and maintained at reflux followed by the addition of 1.1 parts of Vazo initiator (azo-bis-isobutyronitrile) and 10 parts n-propyl alcohol.

(4) To the resultant mixture of Step (3) at reflux was incrementally added a mixture of 63 parts of a 96% composition of hydroxy propyl methacrylate having 3% methacrylic acid, and 1% of the dimers of hydroxy propyl methacrylate and methacrylic acid; 30 parts of acrylic acid; 10 parts acetone; 90 parts n-propyl alcohol, and 0.9 part benzoyl peroxide.

(5) To the resultant mixture at reflux of Step (4) was added:

10 parts acetone
0.45 part benzoyl peroxide followed by a subsequent addition of:

10 parts acetone and
0.23 part benzoyl peroxide.

(6) Heating the resultant mixture of Step (5) was stopped and a mixture of 372 parts anhydrous isopropyl alcohol and 932 parts of demineralized water were added to the resultant mixture of Step (5) to produce an excellent water base dispersion.

EXAMPLE 5

The dispersions produced in Examples 1 through 4 could be made into excellent automotive finishes by the inclusion of colored pigments, aluminum mill bases and suitable plasticizers.

EXAMPLE 6

A water based dispersion of a graft copolymer having a backbone of a 70/14/1 ratio by weight of graft copolymer of methyl methacrylate/butyl methacrylate/2-hydroxy-3-allylaminopropyl methacrylate and a graft segment having a 10/5 ratio by weight of graft copolymer 2-hydroxyethyl acrylate/acrylic acid can be prepared by:

(1) Adding the following ingredients to a reflux flask equipped with a thermometer, stirrer, a heating mantel and a reflux condenser:

700 parts methyl methacrylate
140 parts butyl methacrylate
10 parts addition product of glycidyl methacrylate and allyl amine
350 parts anhydrous isopropyl alcohol
75 parts ethylene glycol monobutyl ether
117 parts butyl alcohol and heating this mixture to a reflux temperature.

(2) Adding a mixture of: 3 parts Vazo initiator (azo-bis-isobutyronitrile); 12 parts anhydrous isopropyl alcohol, and 3 parts butyl alcohol to the mixture of (1) and heating the resultant mixture to a reflux temperature.

(3) Adding a mixture of: 1.5 parts Vazo initiator; 7 parts anhydrous isopropyl alcohol, and 3 parts butyl alcohol to the mixture of (2) and cooling the resultant mixture to 87° C.

(4) Adding a mixture of:

103 parts 2-hydroxyethyl acrylate
50 parts acrylic acid
49 parts anhydrous isopropyl alcohol
16 parts butyl alcohol
1.5 parts Lupersol 11 (described in Example 1)

to the mixture of (3) and heating the mixture at about 87° C. for about 1 hour.

(5) Adding to the reaction mixture 15 parts of anhydrous isopropyl alcohol and 0.8 part of Lupersol 11 to the mixture of (4) above with cooling to about 77° C. followed by adding another 15 parts anhydrous isopropyl alcohol and 0.4 part Lupersol 11.

(6) Adding to the reaction mixture 134 parts anhydrous isopropyl alcohol followed by 500 parts of demineralized water to produce the water based dispersion.

The resulting dispersion can be reduced to a spray viscosity with water and sprayed onto a suitably primed steel panel and baked to form a smooth even and glossy film.

EXAMPLE 7

A water based dispersion of a graft copolymer having a backbone of 70/14/1 ratio by weight of graft copolymer of methyl methacrylate/butyl methacrylate/diethylaminoethyl methacrylate and a graft segment having a 10/5 ratio by weight of graft copolymer of hydroxyethyl acrylate/acrylic acid can be prepared by:

(1) Adding the following ingredients to a reflux flask equipped with a stirrer, a thermometer, a heating mantel and a reflux condenser:

700 parts methyl methacrylate
140 parts butyl methacrylate
10 parts diethylaminoethyl methacrylate
350 parts anhydrous isopropyl alcohol
75 parts ethylene glycol monobutyl ether
117 parts butyl alcohol and heating this mixture to a reflux temperature.

(2) Adding a mixture of: 3 parts Vazo initiator; 12 parts anhydrous isopropyl alcohol, and 3 parts butyl alcohol to the mixture of (1) and heating the resultant mixture to a reflux temperature (3) Adding a mixture of: 1.5 parts Vazo initiator (azo-bis-isobutyronitrile); 7 parts anhydrous isopropyl alcohol, and 3 parts butyl alcohol to the mixture of (2) and cooling the resultant mixture to 87° C.

(4) Adding a mixture of:

103 parts 2-hydroxyethyl acrylate
50 parts acrylic acid
49 parts anhydrous isopropyl alcohol
16 parts butyl alcohol
1.5 parts Lupersol 11 (Described in Example 1)

to a mixture of (3) above and heating the mixture to about 87° C. for about 1 hour.

(5) Adding 15 parts of anhydrous isopropyl alcohol and 0.8 part of Lupersol 11 to the mixture of (4) above and cooling to about 77° C. followed by another addition of 15 parts anhydrous isopropyl alcohol and 0.4 Lupersol 11.

(6) Adding 134 parts anhydrous isopropyl alcohol to the mixture of (5) followed by adding 500 parts of demineralized water to produce the water based dispersion.

The resulting dispersion can be reduced to a spray viscosity with water and sprayed onto a suitably primed steel panel and baked to form a smooth even and glossy film.

EXAMPLE 8

A water based dispersion of a graft copolyer having a backbone of 70/14/1 ratio by weight of graft copolymer of methyl methacrylate/butyl methacrylate/2-hydroxy-3-acryloxypropyl methacrylate and a graft segment having a 10/5 ratio by weight of graft copolymer of hydroxyethyl acrylate/acrylic acid can be prepared by:

(1) Adding the following ingredients to a reflux flask equipped with a stirrer, a thermometer, a heating mantel and a reflux condenser 700 parts methyl methacrylate
140 parts butyl methacrylate
6.6 parts glycidyl methacrylate
540 parts dioxane and heating this mixture to 90° C.

(2) Adding a mixture of: 3 parts Vazo initiator (azo-bis-iso-butyronitrile), and 15 parts dioxane to the mixture of (1) above and heating the resulting mixture to 90° C.

(3) Adding a mixture of 1.5 parts Vazo initiator (azo-bis-iso-butyronitrile), and 10 parts dioxane to the mixture of (2) above and cooling the resultant mixture to about 82° C. and holding at this temperature for 30 minutes and then cooling to 65° C.

(4) Adding the following ingredients consecutively to the above reaction mixture holding the temperature at 65° C. for 30 minutes: 4.7 parts triethylamine, and 3.4 parts acrylic acid (5) Adding a mixture of 103 parts 2-hydroxyethyl acrylate
50 parts acrylic acid
49 parts anhydrous isopropyl alcohol
16 parts butyl alcohol
1.5 parts Vazo initiator to the reaction mixture and heating the mixture to about 82° C. for about one hour.

(6) Adding 15 parts of anhydrous isopropyl alcohol and 0.8 part of Vazo initiator to the reaction mixture with cooling to about 75° C. followed by another addition of 15 parts anhydrous isopropyl alcohol and 0.4 part Vazo initiator.

(7) Adding 134 parts anhydrous isopropyl alcohol to the mixture of (6) followed by adding 500 parts of demineralized water to produce the water based dispersion.

The resulting dispersion can be reduced to a spray viscosity with water and sprayed onto a suitably primed steel panel and baked to form a smooth even glossy film.

EXAMPLE 9

A water based dispersion of a graft copolymer having a backbone of 70/14/1 ratio by weight of graft copolymer of methyl methacrylate/butyl methacrylate/butoxyethyl methacrylate and a graft segment having a 10/5 ratio by weight of graft copolymer of hydroxyethyl acrylate/acrylic acid can be prepared by:

(1) Adding the following ingredients to a reflux flask equipped with a stirrer, a thermometer, a heating mantel and a reflux condenser:

700 parts methyl methacrylate
140 parts butyl methacrylate
10 parts butoxyethyl methacrylate
350 parts anhydrous isopropyl alcohol
75 parts ethylene glycol monobutyl ether
117 parts butyl alcohol and heating this mixture to a reflux temperature.

(2) Adding a mixture of: 3 parts Vazo initiator (azo-bis-isobutyronitrile); 12 parts anhydrous isopropyl alcohol, and 3 parts butyl alcohol to the mixture of (1) and heating the resultant mixture to a reflux temperature.

(3) Adding a mixture of: 1.5 parts Vazo initiator; 7 parts anhydrous isopropyl alcohol; and 3 parts butyl alcohol to the mixture of (2) and cooling the resultant mixture to 87° C.

(4) Adding a mixture of:

103 parts 2-hydroxyethyl acrylate
50 parts acrylic acid
49 parts anhydrous isopropyl alcohol
16 parts butyl alcohol
1.5 parts Lupersol 11 (Described in Example 1)

to the mixture of (3) and heating the mixture to about 87° C. for about one hour.

(5) Adding 15 parts of anhydrous isopropyl alcohol and 0.8 part of Lupersol 11 to the reaction mixture with cooling to about 77° C. followed by adding another 15 parts anhydrous isopropyl alcohol and 0.4 part Lupersol.

(6) Adding 134 parts anhydrous isopropyl alcohol to the reaction mixture followed by the addition of 500 parts demineralized water to produce the water based dispersion.

The resulting dispersion can be reduced to a spray viscosity with water and sprayed onto a suitably primed steel panel and baked to form a smooth even glossy film.

What is claimed is:

1. An entropically stabilized graft copolymer having a backbone segment which is a copolymer of (a) monomer units having the general structure

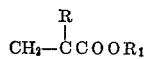

where R is H, $CH_3$ or $CH_2CH_3$, and $R_1$ is an alkyl or cycloalkyl group of 1–18 carbon atoms, and (b) monomer units having the general formula

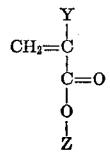

where

Y is $CH_3$ or $CH_2-CH_3$; Z is $CH_2-N\diagdown_{R_5}^{R_4}$, $CH_2-CH_2-N\diagdown_{R_5}^{R_4}$

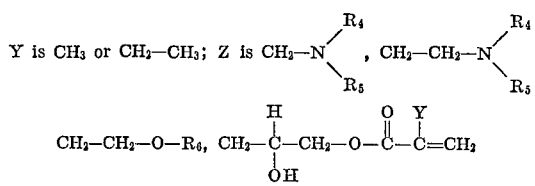

or

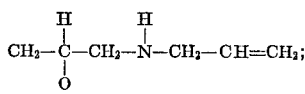

where $R_4$ and $R_5$ are H or an alkyl group having 1 through 4 carbon atoms, $R_6$ is an alkyl group having 1 through 4 carbon atoms; and the graft segment is comprised of a polymer of from 70 to 100% by weight of water soluble hydroxy monomers selected from the group consisting of hydroxyethyl acrylate, hydroxyethyl methacrylate, hydroxypropyl methacrylate, hydroxypropyl acrylate, hydroxybutyl acrylate, and hydroxybutyl methacrylate and from 0 to 30% by weight of monomers having the general structure

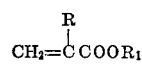

where R is H, $CH_3$ or $-CH_2CH_2$, and $R_1$ is an alkyl or cycloalkyl group of 1–18 carbon atoms.

2. The graft copolymer of claim 1 wherein units from the (a) monomer form from 85 to 100% by weight and units from the (b) monomer form from 0 to 15% by weight of the backbone segment, said backbone segment comprising from 60 to 90% by weight of the total graft copolymer and the graft segment comprising from 10 to 40% by weight of the total graft copolymer.

3. The graft copolymer of claim 2 wherein the backbone segment has a molecular weight (number average) of from 10,000 to 200,000 and a solubility parameter value of from 7 to 12 and wherein the graft segment has a molecular weight of from 2,000 to 20,000 (number average) and a solubility parameter value of from 12 to 22.

4. The graft polymer of claim 3 wherein there is a solubility parameter gradient of 5 to 7 parameter units between the backbone and graft segments and wherein the units from the (b) monomer comprise from 0.2 to 5% by weight of the backbone segment, said backbone segment comprising from 70 to 80% by weight of the graft copolymer, the graft segment comprising from 10 to 35% of said graft copolymer and the water soluble hydroxy acrylic monomers comprising from 7 to 40% by weight of said graft copolymer.

5. The graft copolymer of claim 1 in which the "b" monomer is 2-hydroxy-3-allylaminopropyl methacrylate, diethylamino ethyl methacrylate, 2-hydroxy-3-acryloxypropyl methacrylate, or butoxyethyl methacrylate.

6. A coating composition comprising the graft copolymer of claim 1, a solvent or solvent blend selected from the group consisting of water and water miscible organic solvents, said solvent blend having a solubility parameter value of from 12 to 22, pigments, metallics and plasticizers.

7. A coating composition comprising the graft copolymer of claim 2, a solvent or solvent blend selected from the group consisting of water and water miscible organic solvents, said solvent blend having a solubility parameter value of from 12 to 22, pigments, metallics and plasticizers.

8. A coating composition comprising the graft copolymer of claim 3, a solvent or solvent blend selected from the group consisting of water and water miscible organic solvents, said solvent blend having a solubility parameter value of from 12 to 22, pigments, metallics and plasticizers.

9. A coating composition comprising the graft copolymer of claim 4, a solvent or solvent blend selected from the group consisting of water and water miscible organic solvents, said solvent blend having a solubility parameter value of from 12 to 22, pigments, metallics and plasticizers.

10. A coating composition comprising the graft copolymer of claim 5, a solvent or solvent blend selected from the group consisting of water and water miscible organic solvents, said solvent blend having a solubility parameter value of from 12 to 22, pigments, metallics and plasticizers.

References Cited
UNITED STATES PATENTS

| | | | |
|---|---|---|---|
| 3,037,948 | 6/1962 | Landler et al. | 260—4 |
| 3,311,583 | 3/1967 | Bearden | 260—29.6 |
| 3,485,777 | 12/1969 | Gaylord | 260—17.4 |
| 3,505,256 | 4/1970 | Duffy et al. | 260—22 |

WILLIAM H. SHORT, Primary Examiner

E. A. NIELSEN, Assistant Examiner

U.S. Cl. X.R.

117—132 C, 161 UT; 260—29.4 UA, 29.6 RW, 29.7 W, 31.4 R, 32.8 R, 33.2 R, 885

UNITED STATES PATENT OFFICE
CERTIFICATE OF CORRECTION

Patent No. U.S.P. 3,801,524　　Dated April 2, 1974

Inventor(s) Fred Walter Parker

It is certified that error appears in the above-identified patent and that said Letters Patent are hereby corrected as shown below:

Claim 1, column 11, line 18, delete the formula and insert the following formula:

Claim 1, column 11, line 43, delete the formula and insert the following formula:

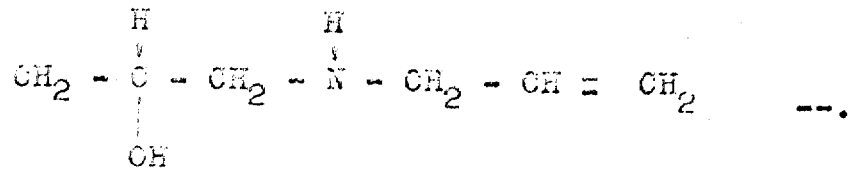

Claim 4, column 12, line 8, delete "polymer" and insert -- copolymer" --.

Signed and sealed this 10th day of September 1974.

(SEAL)
Attest:

McCOY M. GIBSON, JR.
Attesting Officer

C. MARSHALL DANN
Commissioner of Patents